United States Patent [19]

Kozlov et al.

[11] 3,890,050
[45] June 17, 1975

[54] DEVICE FOR MEASURING NONUNIFORMITY OF PHOTOPARAMETRIC CHARACTERISTICS OF MATERIALS

[76] Inventors: Vladimir Dmitrievich Kozlov, 15 Parkovaya ulitsa, 26, korpus 3, kv. 164; Isaak Yankelevich Breido, ulitsa Kirpichnaya, 47, kv. 53, both of Moscow, U.S.S.R.

[22] Filed: Apr. 10, 1973

[21] Appl. No.: 349,811

[52] U.S. Cl. .............. 356/237; 250/562; 250/572; 356/201; 356/239
[51] Int. Cl. .......................................... G01n 21/32
[58] Field of Search.................. 356/201, 237, 239; 250/562, 572

[56] References Cited
UNITED STATES PATENTS
3,743,431  7/1973  Cushing et al. ..................... 356/239

*Primary Examiner*—Ronald L. Wibert
*Assistant Examiner*—F. L. Evans

[57] ABSTRACT

A device for measuring the non-uniformity of photoparametric characteristics of materials and which comprises a luminous signal source, a photoelectric sensor disposed across the path of luminous signals and transforming the latter into electric signals and corresponding to a particular photoparametric characteristic of the material being investigated, and also a decoder with an analyzer whose input is connected electrically to the output of the photoelectric sensor, and whose output is connected to the input of a visual indicator. The visual indicator has a frame time-base circuit, and electric signals are so displayed thereon so that when the value of an electric signal from the photoelectric sensor corresponds to that of a preset reference electric signal, the visual indicator shows an image of regions of equal values of the photoparametric characteristics of the material being investigated in the form of equally bright zones.

8 Claims, 7 Drawing Figures

DEVICE FOR MEASURING NONUNIFORMITY OF PHOTOPARAMETRIC CHARACTERISTICS OF MATERIALS

The present invention relates to control-and-testing equipment, and more particularly to a device for measuring the non-uniformity of photoparametric characteristics of materials predominantly used in electronics, lighting engineering, astronomy, as well as in textile, chemical and other industries.

The proposed device is basically intended for the measurement of such photoparametric characteristics of materials as non-uniformity of sensitivity of photocathodes of photoelectric multipliers, photocells and multielement (matrix) radiation detectors, optical density of transparent and semitransparent materials, non-uniformity of brightness of screen and other luminous and reflecting surfaces, as well as for determining the dispersive composition of particles.

Known in the art are devices for measuring the non-uniformity of photoparametric characteristics of materials by means of luminous signals from a luminous signal source, transformed by a photoelectric sensor, disposed across the path of the luminous signals, into electric signals corresponding to the photoparametric characteristics of the material being investigated, and displayed on a visual indicator electrically coupled to the photoelectric sensor, the frame time-base circuit of the indicator corresponding to the coordinates of respective points on the material being investigated.

In the prior art devices no provision is made for automatically determining the quantitative distribution of a particular parameter over the entire surface of the material being investigated.

The quantitative determination of the distribution of a particular parameter over the entire surface of a material necessitates additional rather cumbersome processing of the data displayed on the visual indicator screen in the form of, for example, curves of the parameter intensity (level) versus the position of a respective point on the material being investigated, in the given direction.

This additional data processing usually consists in decoding, by means of said curves, the coordinates of those points on the material being investigated that correspond to a particular level of the parameter under consideration, and in plotting the obtained values on paper. The accuracy of measurement of the curves obtained as a result of decoding is low, and the graphical processing of data is time-consuming.

Thus, the prior art devices fail to provide for the required accuracy, promptness and visualization.

It is an object of the present invention to provide a device for measuring the non-uniformity of photoparametric characteristics of materials, ensuring automatic determination of the quantitative characteristic of distribution of a particular parameter over the entire surface of the material being investigated.

Another object of the invention is to ensure luminous display of this distribution on a visual indicator screen in the form of regions of equal values of a particular parameter, as well as accurate and prompt measurement.

The objects are achieved by that a device for measuring the non-uniformity of photoparametric characteristics of a material by means of luminous signals from a luminous signal source, transformed by a photoelectric sensor, disposed across the path of the luminous signals, into electric signals corresponding to the photoparametric characteristics of the material being investigated, and displayed on the screen of a visual indicator electrically coupled to the photoelectric sensor, the frame time-base of the indicator corresponding to the coordinates of respective points on the material being investigated, comprises, according to the invention, a decoder with an analyzer whose input is electrically connected to the output of the photoelectric sensor and whose output is connected to the input of the visual indicator so that when the value of an electric signal coming from the photoelectric sensor corresponds to that of the reference electric signal, displayed on the indicator screen are the regions of equal values of a particular parameter of the material being investigated, in the form of equally bright zones, It is expedient that the decoder be also provided with at least one reference voltage generator electrically coupled to the analyzer.

The device should be preferably embodied so that the frame time-base circuit of the luminous signal source or of the photoelectric sensor be synchronized with that of the visual indicator in a manner that displayed on the indicator screen are the regions of equal values of a particular parameter of the material being investigated in the form of equally bright zones whose distribution corresponds by coordinates to that of the regions of equal values of the parameter in question.

It is also preferable that the luminous signal source be provided with a means for projecting the light flux  ιι the photocathode of the photoelectric sensor.

If the luminous signal source has a frame time-base circuit, it is advantageous that for measuring the non-uniformity of a particular parameter, namely the non-uniformity of luminous intensity of the material being investigated, used as the latter be the luminous signal source, then the equally bright zones on the indicator screen will correspond to the regions of equal luminous intensities of the material being investigated.

If the photoelectric sensor has a frame time-base circuit, it is expedient that for measuring the non-uniformity of a particular parameter, namely the non-uniformity of luminous intensity of the material being investigated, used as the luminous signal source be the material itself, then the equally bright zones on the indicator screen will correspond to the regions of equal luminous intensities of the material being investigated.

If the luminous signal source has a frame time-base circuit, it is advisable that for measuring the non-uniformity of a paraticular parameter, namely the non-uniformity of optical density of transparent and semitransparent materials, the material being investigated be placed in front of the photoelectric sensor across the path of the luminous signals coming from the source, then the equally bright zones on the indicator screen will correspond to the regions of equal optical densities of transparent and semitransparent materials.

If the luminous signal source has a frame time-base circuit, it is preferable that for measuring the non-uniformity of a particular parameter, namely the non-uniformity of sensitivity of the material being investigated, used as the latter be the lightsensitive layer of the photoelectric sensor itself, then the equally bright zones on the indicator screen will correspond to the regions of equal sensitivities of the lightsensitive layer.

The proposed embodiments of the novel device ensure instantaneous display on the visual indicator screen of the distribution of the values being measured over the entire surface of the investigated material, as well as permit of obtaining a quantitative estimate thereof with an accuracy within 1 percent. The high accuracy and quick action of the device make it possible to promptly intervene in a production process to improve the quality of the product and to reduce spoilage.

Moreover, in measuring the non-uniformity of sensitivity of photocathodes of photoelectric instruments, the device of the present invention enables a selection of optimum modes of operation.

The invention will now be described in greater detail with reference to embodiments thereof taken in conjunction with the accompanying drawings, wherein.

Figure 1:
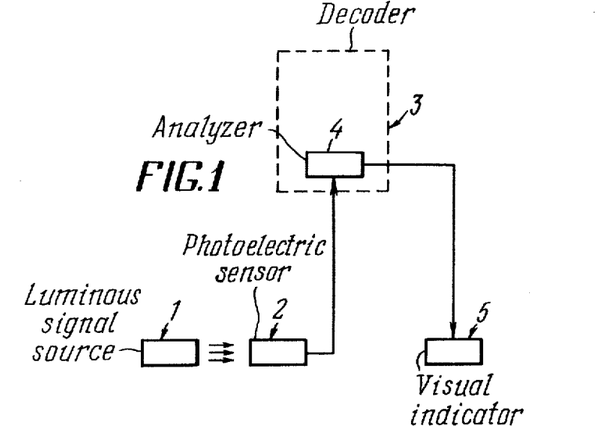
FIG. 1 is a block diagram of a device for measuring the non-uniformity of photoparametric characteristics of materials, according to the invention.

Referring now to FIG. 1, the proposed device for measuring the non-uniformity of photoparametric characteristics of materials according to the invention comprises a luminous signal source 1, a photoelectric sensor 2, a decoder 3, the latter including an analyzer 4 and a visual indicator 5.

The photoelectric sensor 2 is placed across the path of luminous signals coming from the luminous signal source 1. The electric coupling of the photoelectric sensor 2 to the indicator 5 is effected via the decoder 3 incorporating the analyzer 4, the output of the photoelectric sensor 2 being connected to the input of the analyzer 4, and the output of the analyzer 4 being connected to the input of the indicator 5 so that when the value of an electric signal coming from the photoelectric sensor 2 corresponds to a preset reference electric signal, on the screen of the indicator 5 there appears an image of regions of equal values of a particular parameter of the material being investigated in the form of equally bright zones.

The device of the present invention can be used for measuring the following photoparametric characteristics: non-uniformity of luminous intensity of materials, provided the luminous signal source has a frame time-base circuit, non-uniformity of luminous intensity of materials, provided the photoelectric sensor has a frame time-base circuit, non-uniformity of optical density of transparent and semitransparent materials, provided the luminous signal source has a frame time-base circuit, and non-uniformity of photosensitivity of materials, provided the luminous signal source has a frame time-base circuit.

The device for measuring the non-uniformity of luminous intensity of materials with the luminous signal source provided with a frame time-base circuit, is intended for measuring the above characteristic in raster-type light emitters (cathode-ray tubes, illuminated indicator boards, solid-state display units, electroluminescent indicators).

Figure 2:
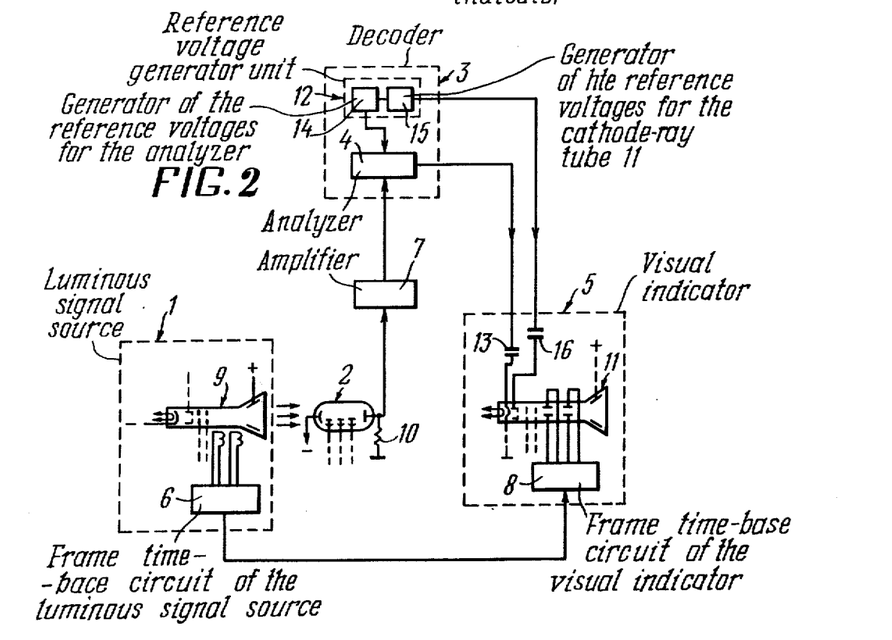
FIG. 2 is a functional diagram of a device for measuring the non-uniformity of luminous intensity of the material being investigated, according to the invention.

The device for measuring the non-uniformity of luminous intensity of materials with the luminous signal source provided with a frame time-base circuit, embodied as shown in FIG. 2, comprises a luminous signal source 1 provided with a frame time-base circuit 6, a photoelectric sensor 2, an amplifier 7 of electric signals, a visual indicator 5 including a frame time-base circuit 8 and a decoder 3.

Used as the luminous signal source 1, in this embodiment, is the material being investigated proper, i.e. a cathode-ray tube 9 with the frame time-base circuit 6, which tube is investigated for non-uniformity of luminous intensity of its screen. The frame time-base circuit 6 provides for the frame time-base of the luminous signal source 1 and is a widely known circuit.

Used as the photoelectric sensor 2, in the embodiement under consideration, is a photoelectric multiplier.

Another embodiement is possible, wherein a photocell is used as the photoelectric sensor.

Used as the load of the photoelectric sensor 2 is a resistor 10 inserted between its anode and the ground.

The photoelectric sensor 2 is disposed across the path of luminous signals emanating from the luminous signal source 1, the output of the sensor being electrically coupled to the input of the amplifier 7 which may be one of the known amplifiers (the gain of the photoelectric sensor 2 being sufficiently high, the amplifier 7 becomes unnecessary).

In this embodiment, used as the visual indicator 5 is a cathode-ray tube 11 with the circuit 8 of its frame time-base.

The decoder 3 comprises an analyzer 4 and a reference voltage generator unit 12. One input of the analyzer 4 is connected to the output of the amplifier 7 (in case the amplifier is not used, to the output of the photoelectric sensor 2). The other input of the analyzer 4 is connected to the output of the reference voltage generator unit 12. The output of the analyzer 4 is connected via a capacitor 13 to the cathode of the cathode-ray tube 11.

The reference voltage generator unit 12 consists of a generator 14 of the reference voltages for the analyzer 4 and, electrically coupled thereto, a generator 15 of the reference voltages for the cathode-ray tube 11, the latter generator providing the illuminating voltage for additionally increasing the luminous intensity interval of the regions of equal values of the parameter being investigated, displayed on the screen of the cathode-ray tube 11.

The reference voltage generator unit 12 has two outputs, the first output, which is that of the generator 14 of the reference voltages for the analyzer 4, being connected to the output of the latter, and the second output, which is the output of the generator 15 of the reference voltages for the cathode-ray tube 11, being connected via a capacitor 16 to the modulator of the cathode-ray tube 11.

The analyzer 4 (FIG. 3) comprises a main discriminator 17, an amplifier 18, an inverter using a tube 19, a cathode follower using a tube 20, another cathode follower using a tube 21, a delay line 22, a lower discriminator 23, an upper discriminator 24, an inverter using a tube 25, a shaping flip-flop 26, an anticoincidence circuit 27, an inverter using a tube 28, and an output cathode follower using a tube 29.

Figure 3:
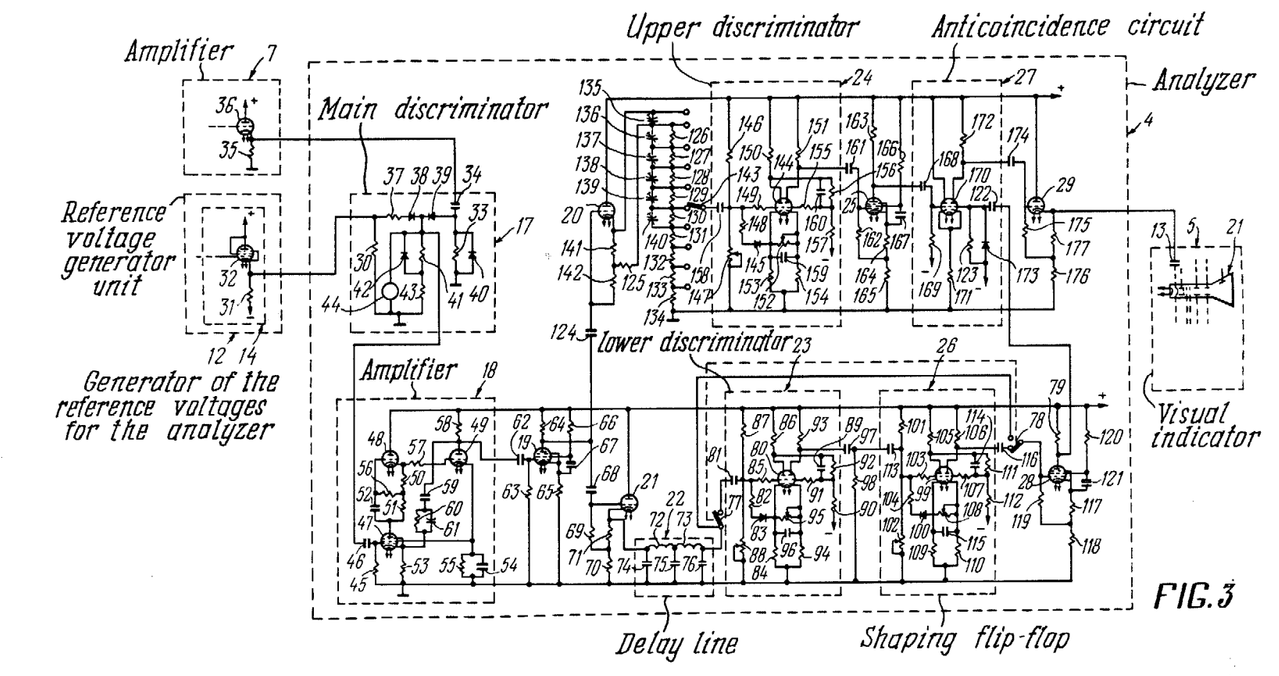
FIG. 3 is a circuit diagram of the analyzer of the proposed device, according to the invention.

An input resistor 30 of the first input of the main discriminator 17 is electrically coupled to an output resistor 31 of an output cathode follower using a tube 32, which cathode follower forms part of the generator 14 of the reference voltage generator unit 12. An input resistor 33 of the second input of the main discriminator 17 is electrically coupled via a capacitor 34 to an output resistor 35 of an output cathode follower using a tube 36, which cathode follower belongs to the amplifier 7.

The input resistor 30 of the main discriminator 17 is connected via a resistor 37 to the anode of a diode 38. The input resistor 33 has the anode of a diode 39 connected to the point of its connection to the capacitor 24. A diode 40 is placed in parallel with the resistor 33. The cathodes of the diodes 38 and 39 are interconnected and a resistor 41 is coupled to the point of their interconnection. A compensating diode 42 is connected in parallel with the resistor 41. Connected in series with the resistor 41 is a grounded resistor 43. Placed in parallel with the resistors 41 and 43 is a voltmeter 44.

The resistors 41 and 43 are the output resistors of the main discriminator 17. The output of the main discriminator 17 is connected via a capacitor 46 to an input resistor 45 of an amplifier 18. The amplifier 18 is a three-stage circuit incorporating a pentode 47 and triodes 48 and 49. The anode load of the tube 47 is the effective resistance of series-connected resistors 50 and 51, as well as the cathode stage using the tube 48. The input resistor 45 is inserted between the control grid of the tube 47 and the ground.

The anode of the tube 47 is connected to the control grid of the tube 48 via a capacitor 52. A resistor 53 is inserted between the cathode of the tube 47 and the ground. The cathode and suppressor grid of the tube 47 are interconnected. Placed between the screen grid of the tube 47 and the ground is a filter constituted by parallel-connected capacitor 54 and resistor 55.

A resistor 56 is inserted between the point of connection of the resistors 50 and 51 and the control grid of the tube 48. The cathode of the tube 48 is connected to the control grid of the output amplifier stage using the tube 49, via a resistor 57. A resistor 58 serves as the anode load of the tube 49.

The cathode of the tube 49 and the screen grid of the tube 47 are interconnected, which ensures a negative feedback in case of slow voltage variations. The anode of the tube 49 is connected to the cathode of the tube 47 via a circuit made up by series-connected capacitor 59 and resistor 60, the latter being shunted by a capacitor 61.

The output of the amplifier 18, namely the anode of the tube 49, is connected, via a circuit formed by a capacitor 62 and a resistor 63, to the control grid of the tube 19 of the respective inverter. The anode load of this inverter is a resistor 64, and its cathode load is a resistor 65. The cathode and the suppressor grid of the tube 19 are interconnected. A resistor 66 is inserted between the power source and the screen grid of the tube 19. Placed between the screen grid and the cathode of the tube is a capacitor 67 serving as a filter.

The output of the invertor, the anode of the tube 19, is connected to the inputs of the cathode followers using the triodes 20 and 21.

The input of the cathode follower using the triode 21 is the control grid of the latter. The anode of the tube 19 is connected to the control grid of the triode 21 via a circuit formed by a capacitor 68 and series-connected resistors 69 and 70. The cathode load of the triode 21 is series-connected bias resistor 71 and resistor 70. The resistor 69 through which the control grid is biased, is inserted between the point of connection of the resistors 71 and 70 and the control grid of the triode 21.

The output of the triode 21, namely its cathode, is connected to the input of the delay line 22 comprising inductance coils 72, 73 and capacitors 74, 75 and 76.

The output of the delay line 22 is connected to a switch 77. By means of the switch 77 and another switch 78 which are mechanically interconnected, the output of the delay line 22 may be connected either to the input of the lower discriminator 23, or to the input of the inverter using the tube 28 whose anode load comprises a resistor 79.

The lower discriminator 23 is a flip-flop using a twin triode 80.

The left triode of the twin triode 80 constitutes the input stage of the discriminator 23, and the right triode thereof constitutes the output stage of the latter. The control grid of the left triode of the twin triode 80 is connected to the switch 77 via a circuit incorporating a capacitor 81, a resistor 82, a diode 83, and a resistor 84. Inserted between the control grid of the left triode of the twin triode 80 and the point of connection of the capacitor 81 to the resistor 82 is a decoupling resistor 85. The anode load of the left triode of the twin triode 80 is a resistor 86, and the resistor 84 is inserted between its cathode and the ground.

Series-connected resistors 87 and 88 make up a voltage divider. A positive bias is applied by means of this divider to the control grid of the left triode of the twin triode 80, which bias is then taken from the point of connection of the resistor 87 to the resistor 88. The divider is placed between the anode supply source and the ground.

The anode of the left triode of the twin triode 80 is connected to the right triode thereof via a circuit constituted by a capacitor 89 and a resistor 90. A decoupling resistor 91 is inserted between the control grid of the right triode of the twin triode 80 and the point of connection of the capacitor 89 to the resistor 90. The capacitor 89 is shunted by a resistor 92. Used as the anode load of the right triode of the twin triode 80 is a resistor 93, and a resistor 94 is inserted between its cathode and the ground.

The cathodes of the left and right triodes of the twin triode 80 are interconnected via a variable resistor 95 which controls the coupling between said cathodes, determining the response of the discriminator 23. The resistor 95 is shunted by a capacitor 96.

The output of the right stage of the discriminator 23, namely the anode of the right triode of the twin triode 80, is connected to a differentiator including a capacitor 97 and a resistor 98. The output of the differentiator, which is the point of connection of the capacitor 97 to the resistor 98, is coupled to the input of the shaping flip-flop 26.

The flip-flop 26 is similar to the flip-flop 23 and incorporates a twin triode 99, and a diode 100, resistors 101, 102, 103, 104, 105, 106, 107, 108, 109, 110, 111, 112 and capacitors 113, 114, and 115. The output of the flip-flop 26 is connected via a capacitor 116 to the switch 78 which is in turn connected to the control grid of the inverter tube 28. The inverter has the resistor 79 as its anode load, and series-connected resistors 117 and 118 as its cathode load, the resistor 117 serving to bias the control grid of the tube 28. The cathode and suppressor grid of the tube 28 are interconnected. A bias voltage is applied from the point of connection of the resistors 117 and 118 to the control grid of the tube 28 via a resistor 119. A resistor 120 is inserted between the anode supply and the screen grid of the tube 28, and a filter capacitor 121 is placed between the screen grid and the cathode of said tube.

The output of the inverter, namely the anode of the tube 28, is connected to the second input of the anticoincidence circuit 27 via a circuit constituted by a capacitor 122 and a resistor 123.

The input of the cathode follower using the tube 20, is the control grid of the latter. The anode of the inverter tube 19 is coupled to said control grid via a circuit formed by a capacitor 124 and a frequency-compensated divider comprising series-connected resistors 125, 126, 127, 128, 129, 130, 131, 132, 133, 134 and trimmer capacitors 135, 136, 137, 138, 139, 140. The capacitor 135 is placed in parallel with resistors 141 and 125, while the capacitors 136, 137, 138, 139 and 140 are placed in parallel with the resistors 126, 127, 128, 129 and 130, respectively. The resistor 141 is inserted between the cathode of the triode 20 and the point of connection of resistors 142 and 125. The resistor 141 is a bias resistor, which bias is applied to the control grid of the triode 20 via the resistor 142. The frequency-compensated divider is connected via a switch 143 to the input of the upper discriminator 24.

The upper discriminator 24 is similar to the lower discriminator 23, being a flip-flop including a twin triode 144, a diode 145, resistors 146, 147, 148, 149, 150, 151, 152, 153, 154, 155, 156, 157 and capacitors 158, 159, 160.

The output of the upper discriminator 24 is coupled via a capacitor 161 to the input of the inverter using the tube 25, resistors 162, 163, 164, 165, 166 and a capacitor 167, said inverter being analogous to the inverter using the tube 28.

The output of the inverter, namely the anode of the tube 25, is connected, via a circuit formed by a capacitor 168 and a resistor 169, to the control grid of the left half of a twin triode 170 which is the first input stage of the anticoincidence circuit 27. The second input stage of the anticoincidence circuits 27 uses the right half of the twin triode 170.

The cathodes of the twin cathode 170 have a common cathode load, a resistor 171. The anode load of the right half of the twin triode 170 comprises a resistor 172. Connected to the control grid of the right cathode of the twin cathode 170, via a circuit formed by the capacitor 122 and the resistor 123, is the output of the inverter tube 28. Placed in parallel with the resistor 123, cathode and control grid of the right half of the twin triode 170 is a diode 173 which serves to carry off negative pulses to ground.

The output of the anticoincidence circuit 27, namely the anode of the right half of the twin triode 170, is connected, via a circuit formed by a capacitor 174 and series-connected resistors 175 and 176, to the control grid of the tube 29, which grid constitutes the output cathode follower of the analyzer 4. A resistor 177 is inserted between the cathode of the tube 29 and the point of connection of the resistors 175 and 176. The latter two make up a voltage divider, and the voltage obtained at their connection point, is applied via the resistor 175 to the control grid of the tube 29, said voltage serving as the bias voltage of the latter. The cathode of the tube 29, which is the output of the cathode follower, is connected to the cathode of the cathode-ray tube 11 via the capacitor 13.

Figure 4:
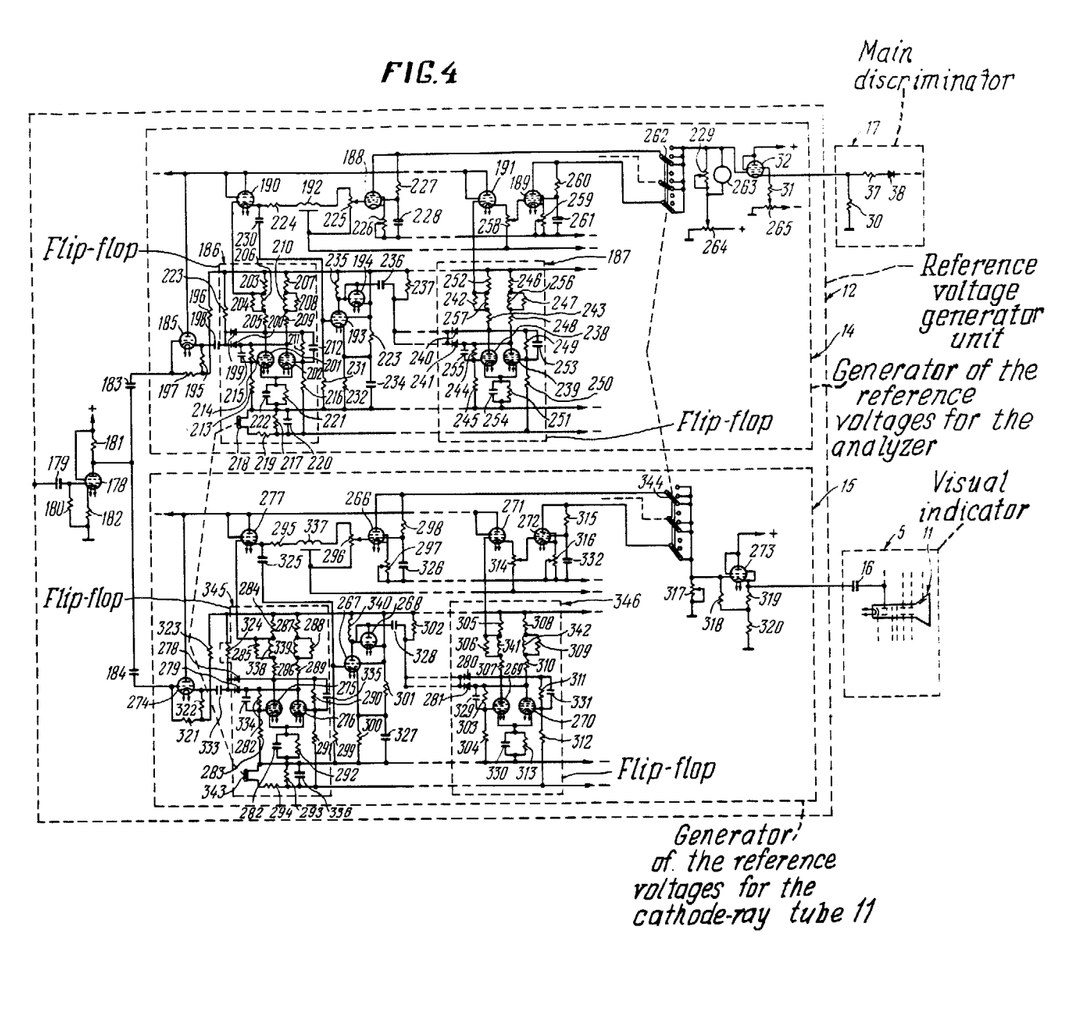
FIG. 4 is a circuit diagram of the reference voltage generator unit of the proposed device, according to the invention.

The reference voltage generator unit 12 (FIG. 4) is intended to generate staircase (reference) voltages to be applied to the analyzer 4 (FIG. 3) and to the cathode-ray tube 11 (FIG. 4). In this embodiment, the generator unit uses vacuum tubes, though in other embodiments it may use semiconductor elements and integrated circuits.

The reference voltage generator unit 12 comprises an amplifier using a tube 178, the generator 14 of the reference voltages for the analyzer 4 (FIG. 3) and the generator 15 of the reference voltages for the cathode-ray tube 11 (FIG. 4).

The amplifier comprises one stage only, and its tube 178 is a pentode.

The circuit, wherethrough starting signals are applied to the control grid of the tube 178, is made up by a capacitor 179 and a resistor 180. The anode load of the tube 178 comprises a resistor 181, and a bias resistor 182 is inserted between its cathode and the ground.

The output of the amplifier, namely the anode of the tube 178, is connected to the input cathode followers of the generators 14 and 15 via coupling capacitors 183 and 184, respectively.

The generator 14 comprises an input cathode follower using a tube 185, three flip-flops (for the sake of convenience, only two flip-flops are shown in the diagram: first flip-flop 186 and third flip-flop 187), three key tubes (only first key tube 188 and third key tube 189 are shown), three cathode followers (only the first and third cathode followers using tubes 190 and 191 respectively, are shown), two delay lines (only first delay line 192 is shown), two intermediate stages (only the first intermediate stage using tubes 193 and 194, is shown), and an output cathode follower using the tube 32.

The cathode load of the cathode follower using the tube 185, is constituted by series-connected resistors 195 and 196. The resistor 195 is placed between the cathode of the tube 185 and the resistor 196, making up with the latter a cathode voltage divider. The voltage obtained at the point of connection of these two resistors, is applied via a resistor 197 to the control grid of the tube 185 biasing the latter.

The output of the cathode follower, namely the cathode of the tube 185, is connected via a capacitor 198 to the cathodes of diodes 199 and 200 of the flip-flop 186. The flip-flop 186 uses two pentodes: 201 (left) and 202 (right). The anodes of the diodes 199 and 200 are coupled to those of the pentodes 201 and 202, respectively. The anode load of the pentode 201 comprises series-connected resistors 203, 204 and 205, the latter resistor being directly connected to the anode. The resistor 204 is inserted between the resistors 203 and 205. A correcting choke 206 is placed in parallel with the resistor 204.

The anode load of the pentode 202 comprises series-connected resistors 207, 208 and 209, the latter being directly connected to the anode of the pentode 202. The resistor 208 is inserted between the resistors 207 and 209. A choke 210 is placed in parallel with the resistor 208.

The anode of the pentode 201 is connected to the control grid of the pentode 202 via parallel connected resistor 211 and capacitor 212. The negative potential to the control grid of the pentode 201 is applied from a common bus via a resistor 213.

The anode of the pentode 202 is connected to the control grid of the pentode 201 via parallel-connected resistor 214 and capacitor 215. The negative potential to the control grid of the pentode 202 is applied from a common bus via series-connected resistors 216 and 217. In the initial state, the resistor 217 is shunted by a resistor 219 through a switch 218. A capacitor 220 is placed in parallel with the resistor 217.

The cathode of the pentodes 201 and 202 are interconnected. The common cathode load of both pentodes comprises a resistor 221 with a capacitor 222 connected in parallel therewith. The cathodes of the diodes 199 and 200 are connected to the anode supply of the pentodes 201 and 202 via a resistor 223.

The output of the first flip-flop 186, namely the point of connection of the resistors 203 and 204, is coupled to the control grid of the tube 190 of the first cathode follower, which tube is a tetrode and whose section grid is connected to its anode.

The cathode load of the tube 190 comprises series-connected resistor 224, delay line 192 and variable resistor 224. The delay line 192 is placed between the resistors 224 and 225, and the cursor of the variable resistor 225 is connected to the control grid of the first key tube 188, the cathode circuit whereof includes a bias resistor 226. The suppressor grid of the tube 188 is connected to its cathode, while the screen grid and aode are interconnected via a resistor 227. A filter capacitor 228 is placed between the screen grid of the tube 188 and the common bus, the anode of said tube being connected to a resistor 229 included in the common anode circuit of the key tubes 188 and 189.

The cathode of the tube 190 is connected, via a circuit made up by a capacitor 230 and a resistor 231, to the control grid of the tube 193 of the first intermediate stage, which tube is a pentode. Inserted between the cathode of the tube 193 and the common bus is a resistor 232, and inserted between the cathode and the anode supply is a resistor 233 forming, together with the resistor 232, a voltage divider providing for a bias between the cathode and control grid. A capacitor 234 is placed in parallel with the resistor 232.

The anode load of the tube 193 comprises a choke 235, connected in parallel where is the tube 194 which is a triode with its anode coupled to that of the tube 193.

The anode of the tube 193 is connected, via a circuit including a capacitor 236 and a resistor 237, to the input of the second flip-flop (not shown), the resistor 237 being inserted between the capacitor 236 and the anode supply.

The arrangement and operation of the second flip-flop, second cathode follower, second delay line and second key tube, all of which are not shown in the drawing for the sake of convenience, are similar to those of the above-described first flip-flop 186, first cathode follower using the tube 190, first delay line 192 and first key tube 188. Therewith, the cathode of the tube of the second cathode follower is connected to the input of the second flip-flip via an intermediate stage whose arrangement and operation is similar to those of the first intermediate stage using the tubes 193 and 194.

The third flip-flop 187, identical with the flip-flop 186, comprises tubes 238, 239, diodes 240, 241, resistors 242, 243, 244, 245, 246, 247, 248, 249, 250, 251, 252, capacitors 253, 254, 255, and correcting chokes 256, 257.

The output of the flip-flop 187 is connected to the control grid of the tube 191 of the third cathode follower. The second grid of this tube is connected to its anode, and the cathode circuit thereof comprises a variiable resistor 258 whose cursor is connected to the control grid of the third key tube 189.

The arrangement of the third key tube 189 is similar to that of the first key tube 188. The stage including the tube 189, also comprises resistors 259, 260 and a capacitor 261.

The second and third key tubes may be coupled, via a switch 262, to the resistor 229, placed in paralle' where-with is a voltmeter 263. The resistor 229 is c )nnected to the cursor of a potentiometer 264 having two output terminals, one terminal being grounded and the other being connected to a positive voltage supply source.

The variable resistor 229 has the control grid of the tube 32 connected to the point of its connection to the anodes of the key tubes 188 and 189, said tube being a pentode and constituting the output cathode follower. The suppressor grid of the tube 32 is connected to its anode, and the screen grid, to the cathode. The latter is connected via the resistor 31 to a potentiometer 265, one terminal whereof is grounded and the other is connected to a negative voltage supply source.

The output of the cathode follower using the tube 32, namely the cathode thereof, is coupled to the first input of the main discriminator 17 via the series-connected resistor 37 and diode 38 of said discriminator. The point of connection of the cathode of the tube 32 to the resistor 37 is grounded via the resistor 30.

The generator 15 of the reference voltages for the cathoderay tube 11 is intended to generate staircase voltages to be supplied to the cathode-ray tube 11 for the illumination thereof. It comprises tubes, 266, 267, 268, 269, 271, 272, 273, 274, 275, 276, 277, diodes 278, 279, 280, 281, resistors 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, capacitors 325, 326, 327, 328, 329, 330, 331, 332, 333, 334, 335, 336, a delay line 337, chokes 338, 339, 340, 341, 342, and switches 343, 344. The tubes 275 and 276 constitute a first flip-flop 345, and the tubes 269 and 270, a third flip-flop 346. The second flip-flop of the generator is not shown.

The first cathode follower of the generator uses the tube 277, and the third cathode follower uses the tube 271. The tube 266 serves as the first key tube, and the tube 272 serves as the third key tube. The first intermediate stage uses the tubes 267 and 268.

The second cathode follower, second key tube and second intermediate stage are not shown in the diagram.

As a whole, the circuit of the generator 15 of the reference voltages for the cathode-ray tube 11 is identical with that of the generator 14 of the reference voltages for the analyzer 4 (FIG. 3). The only diference is in the circuit of the output cathode follower and the arrangement of the resistor 317, common to the key tubes 266 and 272 (FIG. 4), included in the anode circuit of both: the resistor 317 is inserted between the anodes of the tubes 266 and 272, and the ground.

The output cathode follower uses the tube 273 which is a pentode and whose suppressor grid is connected to the cathode, and the screen grin is connected to the anode. The control grid of the tube 273 is connected to the anodes of the tubes 266 and 272 via the switch 344. Inserted between the cathode of the tube 273 and the ground are the series-connected resistors 319 and 320 which make up a voltage divider, and the voltage obtained therefrom is applied via the resistor 318 to the control grid of the tube 273 biasing the latter. The output of the output cathode follower, namely the cathode of the tube 273, is connected to the modulator of the cathode-ray tube 11 via the capacitor 16.

The switch 218 for the initial setting of the generator 14 of reference voltages for the analyzer 4 (FIG. 3), and the switch 343 for the initial setting of the generator 15 of the reference voltages for the cathode-ray tube 11, are mechanically interconnected. Also mechanically interconnected are the switches 262 and 344 of the generators 14 and 15.

The device of the present invention may be embodied so that its reference voltage generators have one, two or more flip-flops each according to the required number of voltage values.

The device for measuring the non-uniformity of luminous intensity of materials by means of luminous signals, the photoelectric sensor of the device being provided with a frame time-base circuit, is intended for light sources with developed surfaces, various screens, as well as for measuring the non-uniformity of coloring of fabrics and other materials.

The device for measuring the non-uniformity of luminous intensity of materials by means of luminous signals, the photoelectric sensor of the device being provided with a frame time-base circuit, comprises a source 1 (FIG. 5) of luminous signals, having a means for projecting the light flux, a photoelectric sensor 347 with a circuit 348 of its frame time-base, a signal amplifier 7, a visual indicator 5 with a circuit 8 of its frame time-base, and a decoder 3.

Figure 5:
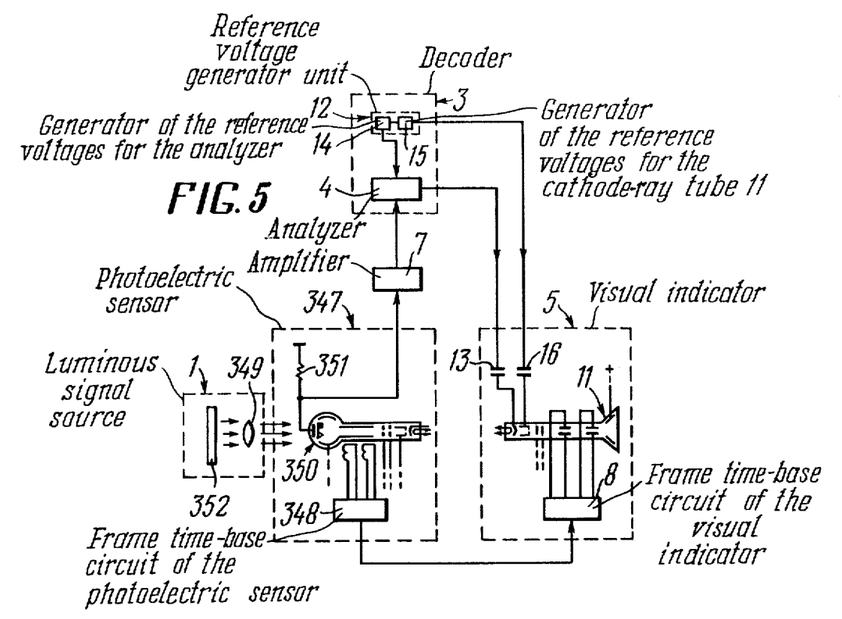
FIG. 5 is a functional diagram of the device for measuring the non-uniformity of luminous intensity of the material being investigated with the photoelectric sensor provided with a frame time-base circuit, according to the invention.

Used as the luminous signal source 1 is, in this embodiment, the luminous material being invenstigated proper. As the photoelectric sensor 347 use is made here of a transmitting tube 350 with the frame time-base circuit 348 which is a well known conventional circuit. The load of the photoelectric sensor 347 comprises a resistor 351 connected to the circuit of the signal plate of the transmitting tube 350.

The photoelectric sensor 347 is placed downstream of a lens 349 across the path of the light flux from a luminous material 352 being investigated. The output of the sensor 347, namely the signal plate of the transmitting tube 350, is electrically connected to the input of the amplifier 7.

The output of the amplifier 7 is electrically connected to the input of the decoder 3 comprising an analyzer 4 and a reference voltage generator unit 12, while the output of the decoder 3 is electrically coupled to the input of the visual indicator 5.

The circuits of the amplifier 7, decoder 3, visual indicator 5 and the functional relations therebetween are similar to those of the same elements of the above-described embodiment of the device for measuring the non-uniformity of luminous intensity of materials with the luminous signal source provided with a frame time-base circuit.

The device for measuring the non-uniformity of optical density of transparent and semitransparent materials with the luminous signal source being provided with a frame time-base circuit, is intended for various grids and films, negatives of astronomical and X-ray phorographs, as well as for studying dispersive distibution of particles and other purposes involving measurement of the non-uniformity of densities or plotting of regions and curves of equal densities.

The device for measuring the non-uniformity of optical density of transparent and semitransparent materials with the luminous signal source of the device being provided with a frame time-base circuit, comprises a luminous signal source 1 (FIG. 6) with a frame time-base circuit 6 and a means for projecting the light flux on a photoelectric sensor 2, made, in this embodiement, in the form of a lens 349, and placed across the path of said light flux, an amplifier 7, a decoder 3 and a visual screen 5.

Figure 6:
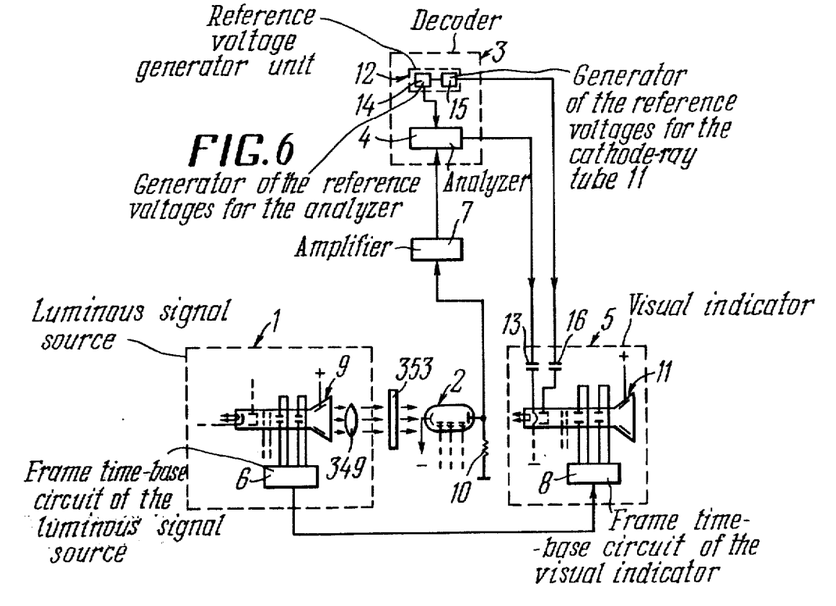
FIG. 6 is a functional diagram of a device for measuring the non-uniformity of optical density of transparent and semitransparent materials with the luminous signal source provided with a frame time-base circuit, according to the invention.

Used as the luminous signal source 1 is, in this case, a cathode-ray tube 9 with the frame time-base circuit 6, the light flux wherefrom is projected by the lens 349 on the photoelectric sensor 2 which, in the embodiment under consideration, is a photoelectric multiplier. The load of the photoelectric multiplier comprises a resistor 10 inserted between its anode and the ground.

A sample 353 of the material being investigated is placed intermediate of the lens 349 and the photoelectric sensor 2 across the path of the light flux emitted by the tube 9.

The output of the photoelectric sensor 2 is connected to the input of the amplifier 7, coupled in turn to the input of the decoder 3 comprising an analyzer 4 and a reference voltage generator unit 12. The output of the decoder 3 is connected to the input of the visual indicator 5.

The circuits of the amplifier 7, decoder 3, visual indicator 5 and the functional relations therebetween are similar to those of the same elements of the above-described embodiment of the device for measuring the non-uniformity of luminous intensity of materials with the luminous signal source provided with a frame time-base circuit.

The device for measuring the non-uniformity of photosensitivity of materials with the luminous signal source provided with a frame time-base circuit, is intended for photocathodes, photoelectric multipliers, photocells, image converters and other photoelectric devices including multielement radiation detectors.

The device for measuring the non-uniformity of photosensitivity of materials with the luminous signal source provided with a frame time-base circuit, comprises a luminous signal source 1 (FIG. 7), an amplifier 7, a decoder 3 and a visual indicator 5.

Figure 7:
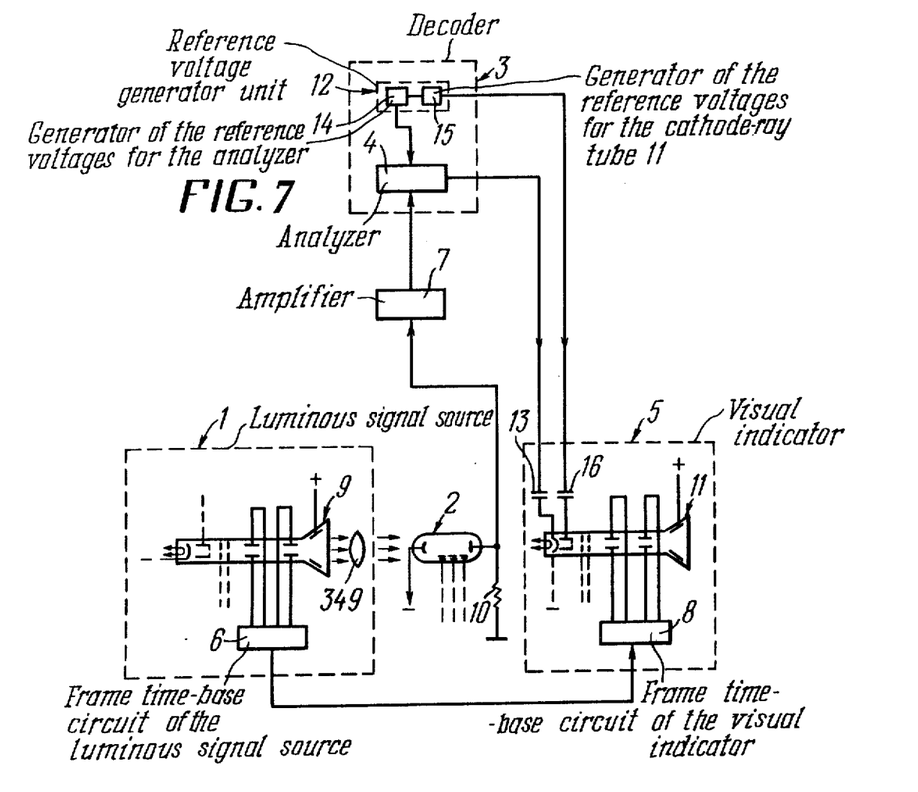
FIG. 7 is a functional diagram of a device for measuring the non-uniformity of sensitivity of the material being investigated with the luminous signal source provided with a frame time-base circuit, according to the invention.

The material being investigated is, in this embodiment, the lightsensitive layer of the photoelectric sensor 2 which in this case is a photoelectric multiplier. The light flux is projected on the photocathode of the multiplier by means of a lens 349, and the load of the photoelectric multiplier comprises a resistor 10 inserted between its anode and the ground.

The output of the photoelectric multiplier, namely its anode, is electrically coupled to the input of the amplifier 7. The output of the amplifier 7 is connected to the input of the decoder 3 comprising an analyzer 4 and a reference voltage generator unit 12. The output of the decoder 3 is connected to the input of the visual indicator 5. The luminous signal source 1, lens 349, amplifier 7, decoder 3, visual indicator 5 and the functional relations between all these components are similar to those of the device for measuring the nonuniformity of optical density of transparent and semitransparent materials.

The operating principle of the device for measuring the non-uniformity of photoparametric characteristics of materials is as follows.

Luminous signals from the source 1 (FIG. 1) are applied to the photocathode of the photoelectric sensor 2. At the output of the latter there appear electric signals corresponding to the parameter being measured. These signals are fed to the input of the decoder 3, wherein they are sorted out by equal amplitudes. From the output of the decoder 3, signals with equal amplitudes are applied to the visual indicator 5, whereon there appear images of regions of equal values of the material being investigated in the form of equally bright zones. The images of the regions of equal values are arranged by coordinates according to the arrangement of the regions of equal values in the material being investigated proper.

The device for measuring the non-uniformity of luminous intensity of materials with the luminous signal source provided with a frame time-base circuit operates as follows.

The light flux emitted by successively flaring spots of the raster of the cathode-ray tube 9 (FIG. 2) of the luminous signal source 1, whose screen is being investigated for non-uniformity of luminous intensity, is incident upon the photocathode of the photoelectric sensor 2, which in this case is a photoelectric multiplier. The signal, appearing at the output of the photoelectric sensor 2 under the effect of the spot flaring at that moment on the screen of the tube 9 and separated by the load 10, is applied via the amplifier 7 to the first input of the analyzer 4 of the decoder 3. Applied to the second input of the analyzer 4 from the reference voltage generator unit 12, also forming part of the decoder 3, is a reference voltage corresponding to the luminous intensity level of the given region.

Likewise, the analyzer 4 operates each time when the scanning beam of the cathode-ray tube 9 being investigated illuminates those spots on the luminescent screen of the tube 9 which correspond to the reference voltage associated with a particular luminous intensity value.

The signals from the output of the analyzer 4 of the decoder 3 are applied to the cathode of the cathode-ray tube 11 of the indicator 5, via the capacitor 13.

The coordinate scanning of the frame of the cathode-ray tube 9 is effected by means of the frame time-base circuit 6, while the coordinate scanning of the frame of the cathode-ray tube 11 of the visual indicator 5 is effected by means of the frame time-base circuit 8.

Since the coordinate scanning of the frame of the cathode-ray tube 9 being investigated is synchronized with that of the cathode-ray tube 11 of the visual indicator 5, the arrival of a signal from the output of the analyzer 4 to the modulator of the tube 11 results in flaring of those spots on the screen of the latter, which correspond by coordinates to the equally bright spots on the screen of the cathode-ray 9 being investigated. The totality of the equally bright spots on the screen of the tube 11 of the visual indicator 5 forms the image of the region of equal values on the screen of the cathode-ray tube 9 being investigated.

When the reference voltage is automatically changed to another value, the device produces spots of different brightness on the screen of the tube 9 (i.e. the image of a region of equal values of a different level is obtained). Therewith, the image of each region on the screen of the tube 11 will differ from that of other regions in brightness (luminous intensity).

If necessary, the required luminous intensity interval between adjacent regions can be increased by means of a staircase voltage applied from the reference voltage generator unit 12 to the modulator of the tube 11 via the capacitor 16, which voltage serves to additionally illuminate the screen of the tube 11 and varies in synchronism with the reference staircase voltage applied to the analyzer 4. Each given region is obtained during the scanning of a single frame and, consequently, the images of the regions appear in succession one after another on the screen of the tube 11. However, due to the persistence of vision, all the regions are perceived as simultaneously appearing on the screen. Besides, used as the cathode-ray tube 11 may be an afterglow tube or a memory tube.

The number and level of luminous intensities of the regions obtained can be altered by varying respectively the number and amplitude of "steps" of the reference staircase voltage.

When a particular value of the reference voltage is set, the device makes it possible to see only one selected region. When it becomes necessary to form the luminous signals emitted by the tube 9 of the luminous signal source 1 as pulses, the modulator or the cathode of the tube 9 may be fed with a blanking pulse voltage from a separate narrow-pulse generator.

Given below in more detail is the operation of the decoder 3.

A reference staircase voltage is applied from the reference voltage generator 14 of the unit 12 to the input resistor 30 (FIG. 3) of the first input of the main discriminator 17 of the analyzer 4. This voltage passes via a circuit formed by the resistor 37, diode 38, and resistors 41 and 43 to the cathode of the diode 39. Applied to the circuit, formed by the capacitor 34 and resistor 33, of the second input of the main discriminator 17 from the output of the amplifier 7 are amplified signals of the photoelectric sensor 2 (FIG. 2) of positive polarity, which signals correspond to the value of the parameter being measured at one or another point of the material being investigated. From said circuit, the signals are further fed to the anode of the diode 39 (FIg. 3), where they are compared with the reference staircase voltage.

If the amplitude of these signals is less than that of the reference voltage "step" applied at this moment, the diode 39 is rendered non-conducting by said voltage. And if the amplitude of the signals is greater than that of the reference voltage, they pass through the diode 39 to the input of the amplifier 18 via the capacitor 46 and resistor 45.

The diode 38 prevents the compared signals from getting to the output of the generator 14 of the reference voltages for the analyzer 4. The thermal compensation of the diodes 38 and 39 is effected by means of the diode 42 and resistors 37 and 41. The reference voltage is controlled by the voltmeter 44.

The amplifier 18 is arranged as a conventional three-stage unit. From the output of the amplifier 18, namely the anode of the triode 49, positive signals are applied via the capacitor 62 and resistor 63 to the control grid of the inverter tube 19, from the anode whereof negative signals are applied to the inputs of the cathode followers using the tubes 20 and 21, respectively. The output signals of the cathode follower using the tube 21 are applied to the input of the delay line 22.

From the output of the delay line 22, the signals are applied, by means of the switches 77 and 78, either the input of the bottom discriminator 23, or directly to the inverter using the tube 28. In the latter case, there will appear at the output of the inverter signals from the photoelectric sensor 2, amplified by the amplifier 18 and delayed by the delay line 22.

Thus, the inverter output signals will differ from one another in amplitude according to the values of the parameter being measured at given points of the material being investigated.

The lower discriminator 23 is a high-speed flip-flop using a known circuit. The lower operation threshold of the lower discriminator 23, brought to the input of the amplifier 18, is approximately equal to that of the main discriminator 17 (the operation threshold of the lower discriminator 23 is determined by the bias voltage across the control grid of the left triode of the twin triode 80, which voltage is set by the divider constituted by the resistors 87 and 88).

In the absence of a trigger signal, the left triode of the twin triode 80 is conducting, while the right triode is non-conducting. As the signal from the output of the delay line 22 is applied via the switch 77 to the input of the left triode of the twin triode 80, the latter becomes non-conducting and the voltage across its anode increases, as a result of which the right triode becomes conducting. The anode current of the right triode, induced at that moment, increases the cathode potential and, via the resistor 95, further renders the left triode non-conducting.

The flip-flop operates rather fast irrespective of the rate of build-up of the signal applied to and acting upon the input of the left triode of the twin triode 80.

When the signal triggering the flip-flop discontinues, the latter instantly returns to the initial state of rest. As a result, there appear at the output of the flip-flop negative pulses each having a duration equal to that of the flip-flop triggering signal, the amplitude and edges of the pulses being equal too. These pulses are differentiated by the circuit formed by the capacitor 97 and resistor 98. Formed at the output of this circuit are a negative and a positive differential pulses. The negative differential pulse, corresponding to the trailing edge of the differentiated pulse, triggers the shaping flip-flop 26 using the twin triode 99. The flip-flop 26 operates in a manner similar to that of the discriminator 23.

At the output of the shaping flip-flop 26, there also appear negative pulses having equal amplitudes and edges, each pulse possessing a duration equal to that of the differential pulse, i.e. considerably less than that of the pulse shaped by the lower discriminator 23.

The output pulse of the shaping flip-flop 26 from the anode of the right triode of the twin triode 99 is applied via the switch 78 to the inverter using the tube 28. In this case, there appear at the output of the inverter signals with equal amplitudes, the latter being different when by means of the switches 77 and 78 applied directly, i.e. bypassing the lower discriminator 23 and the shaping flip-flop 26, to the input of the inverter are signals from the output of the delay line 22.

A positive signal from the anode of the tube 28 is applied via the capacitor 122 and the resistor 123 to the first input of the anticoincidence circuit 27 which is the control grid of the right half of the twin triode 170, the second input of the circuit 27 being the control grid of the left half of said twin triode.

As noted above, the signals from the output of the tube 19 of the inverter are also applied to the cathode follower using the tube 20. The output signals of this cathode follower are separated across the frequency-compensated divider connected into the cathode circuit of the tube 20. This divider comprises the resistors 125, 126, 127, 128, 129, 130, 131, 132, 133, 134 and trimmer capacitors 135, 136, 137, 138, 139, 140. From the divider, the signals are fed via the switch 143 to the input of the upper discriminator 24.

The upper discriminator 24 is a flip-flop similar to that of the bottom discriminator 23.

The operation threshold of the upper discriminator 24, i.e. the upper operation threshold, is set by the variable resistor 147.

The output of the upper discriminator 24 is coupled through the inverter using the tube 25, to the second input of the anticoincidence circuit 27. As the upper discriminator 24 operates, negative signals appearing at its output, the anode of the right triode of the twin triode 144, are applied via the circuit formed by the capacitor 161 and resistors 162 and 165 to the control grid of the tube 25 which is a pentode. From the anode of the tube 25, positive signals pass through the circuit formed by the capacitor 168 and the resistor 169 to the control grid of the left half of the twin triode 170 of the anticoincidence circuit 27.

Under the effect of these signals, the anode current of the left half of the twin triode 170 increases, whereby the potential across the total cathode load of both triodes of the twin triode 170, i.e. the resistor 171, increases too. The right triode becomes non-conducting. Now, the signals applied to the control grid of the right triode of the twin triode 170 will exert no effect thereon.

If the signals passed through the main discriminator 17 are over the operation threshold of the lower discriminator 23 and under that of the upper discriminator 24, it is only the discriminator that operates. The signals from its output are applied via the inverter tube 28 to the input of the right triode of the twin triode 170, and since the latter is not rendered non-conducting by the signal from the upper discriminator 24, further, via the circuit formed by the capacitor 174 and resistors 175 and 176, to the output cathode follower using the tube 29. From the output of said cathode follower, the signals pass via the capacitor 13 to the cathode of the tube 11 of the visual indicator 5.

If the signals passed through the main discriminator 17 exceed the operation threshold of the upper discriminator 24, the latter will operate as well as the lower discriminator 23.

As described above, the right triode of the twin triode 170 of the anticoincidence circuit 27 is non-conducting, and the signals applied from the lower discriminator 23 to the control grid of said right triode, will have no effect upon the latter: no signals will appear at the output of the anticoincidence circuit 27, namely the anode of the right triode of the twin triode 170.

If the inputs of both discriminators 23 and 24 receive a signal which does not exceed the operation threshold of the lower discriminator 23, none of them will operate and no signals will appear at the output of the anticoincidence circuit 27.

Thus, the lower discriminator 23 and the upper discriminator 24 can be used for setting the lower and upper limits (i.e. creating a kind of "electric window"), within which signals are selected by amplitude.

If the lower and upper limits do not differ much, one may consider, with the admissible error being set by the operator, that the signals therebetween have the same amplitude. The upper limit may be set by means of the variable resistor 147 adjusting the operation threshold of the upper discriminator 24, as well as the switch 143 enabling one or another part of the signal to be applied from the frequency-compensated divider to the input of the upper discriminator 24.

The lower limit is set by the operation threshold of the main discriminator 17, i.e. by the reference voltage, as the operation threshold of the lower discriminator 23, brought to the input of the amplifier 18, differs from that of the main discriminator 17 only by a value required to eliminate the nonlinear portion of the characteristic curve of the diode 39.

Consequently, the value of the reference voltage which at this moment is across the input of the main discriminator 17, will determine the level of the region of equal values of the parameter being measured. The signals corresponding to this region, having passed through the "window" and having negative polarity as they arrive to the cathode of the cathode-ray tube 11 of the visual indicator 5, will illuminate the screen of the latter at points corresponding by coordinates to respective points on the surface of the material being investigated. This is accounted for by the fact that the frames of the luminous signal source 1 (FIG. 2) and the visual indicator 5 (in this embodment, cathode-ray tubes 9 (FIG. 2) and 11 (FIG. 3), respectively) are scanned in synchronism, and also by the fact that the reference staircase voltage varies with the scanning frequency of the frames of the tubes 9 (FIG. 2) and 11 (FIG. 3), and in synchronism with the frame repetition rate. The totality of the flaring spots on the screen of the cathode-ray tube 11 forms the region of equal values of the parameter being measured. The coordinates of this region will correspond, therewith, to those of a respective region in the material being investigated.

As one frame replaces another, the level of the reference voltage changes in a jump (a new "step" is set at the main discriminator 17). Now, the level of a new region of equal values of the parameter being measured should be found. The images of these regions will differ markedly in brightness (marking of the regions can be effected by any other known method).

Since the shaping flip-flop 26, triggered by the lower discriminator 23, shapes pulses with the same amplitude, all the spots of the image of a particular region will have the same brightness (luminous intensity).

The device also makes it possible to discern "microrelief" within the region itself.

For that purpose, there should be excluded the lower discriminator 23 and the shaping flip-flop 26 generating signals having the same amplitude irrespective of the amplitudes of the signals active at their inputs, i.e. the output of the delay line 22 should be connected, by means of the switches 77 and 78, to the input of the inverter tube 28.

The delaying of pulses by means of the delay line 22 and their shortening by means of the differentiating circuit made up of the capacitor 97 and resistor 98, are required to ensure reliable operation of the anticoincidence circuit 27.

In this case, the output signal of the upper discriminator 24, which operates when a signal exceeding a preset level is applied to its input, will have greater amplitude and duration than those of the signal applied to the input of the right triode of the twin triode 170 of the anticoincidence circuit 27, and, consequently, no ghost signal will appear at its output. Otherwise, signals passing through the circuits of the reference voltage generator 14 not being properly timed, the signals arriving to the input of the anticoincidence circuit 27 might not coincide and the latter would produce a ghost signal.

The generator 14 of the reference voltages for the analyzer 4 and the generator 15 of the reference voltages for the cathode-ray tube 11 (FIG. 4) use a known circuit. They operate in step with the frame time-base circuits 6 (FIG. 2) and 8 of the luminous signal source 1 and the visual indicator 5, respectively, and hence in step with each other. The synchronization of their operation should be preferably effected by means of signals generated by the frame time-base circuit, which signals coincide in time with the onset of scanning of each frame.

These signals are applied via the capacitor 179 (FIG.4) and resistor 180 to the control grid of the single-stage amplifier tube 178 and, after being amplified thereby, via the cathode followers using the tubes 185 and 274, to the input of the first flip-flop 186 of the reference voltage generator 14 and to the input of the first flip-flop 345 of the reference voltage generator 15, as trigger signals.

In the initial state, the left tubes, namely the pentode 201, tubes 238, 275, 269 of the flip-flops 186, 187 and 345, 346, are non-conducting, while the right tubes are conducting. Connnected to these tubes via cathode followers are their key tubes 188, 189 and 266, 272 which are conducting while the flip-flops 186, 187 and 345, 346 are in the initial state. Therewith, the first tubes 188 and 266 conduct a current $I_o$, the second tubes which are not shown in the diagram conduct a current $2I_o$, and the third tubes 189 and 272 conduct a current $4I_o$. All these currents flow through the common resistors 229 and 317 included in the anode circuit of these key tubes and, therefore, the potential difference at the ends of the resistors 229 and 317 is equal to $R \cdot 7I_o$, where R is the resistance value of the resistors 229 and 317.

The operation of the reference voltage generator 14 is as follows.

As the first trigger signal is applied to the input of the first flip-flop 186, the latter operates and, as a result, the pentode 201 becomes conducting. Therewith, the negative voltage from the resistor 203 which is the anode load of the pentode 201, is applied to the grid of the tube 190 of the cathode follower, rendering it non-conducting. The voltage drop to zero across the cathode of the tube 190 is applied via the delay line 192 to the control grid of the first key tube 188 and renders it non-conducting. As a result, there appears at the output of the generator 14 a positive reference voltage "step" equal to $R_{229} \cdot I_0$.

The negative potential from the cathode of the tube 190 is also applied to the control grid of the intermediate stage tube 193. This, however, exerts no effect whatsoever on the second flip-flop not shown in the diagram, because the tube 193, whose output is connected to the input of the second flip-flop, transforms the negative voltage into a signal of the opposite polarity, in this case positive polarity. And the flip-flop can be triggered only by a negative signal which is ensured by a respective arrangement of the diodes 199 and 200 at its input.

Under the action of the second trigger signal applied to the input of the flip-flop 186, the latter is brought back to the initial state. The potential across the resistor 203 of the anode load of the pentode 201 increases, thus rendering the tube 190 of the cathode follower conducting and increasing the its cathode potential. The variation of the cathode potential is transmitted via the delay line 192 to the first key tube 188 rendering the latter conducting. At the same time, as the first key tube 188 is made conducting, the second key tube not shown in the diagram becomes non-conducting. This is attained as follows.

The variation of the cathode potential of the cathode follower tube 190 is also transmitted to the tube 193, at the anode whereof there appears a pulse shaped by means of the inductance coil 235 into a narrow negative pulse. This pulse is applied to the input of the second flip-flop and triggers it. As a result, the second key tube is rendered non-conducting by the output negative pulse of the second flip-flop, which pulse is applied to its control grid via the second cathode follower and the second delay line which are not shown in the diagram. The current through the second key tube discontinues.

Thus, the current flowing through the common resistor included in the anode circuits of all the key tubes, diminishes, with respect to the current corresponding to the initial state of the reference voltage generator 14, by the value $2I_0$. Consequently, the potential across the resistor 229 will change by a value $2I_0 \cdot R_{229}$, where $R_{229}$ is the resistance value of the resistor 229, i.e. the voltage across the output of the generator 14 will be twice as high as that of the first "step." In other words, the voltage will increase by one "step."

Under the effect of the third trigger signal, the second key tube remains non-conducting, and the first key tube 188 becomes non-conducting too. Therefore, the voltage across the output of the generator 14 increases by the value $I_0 \cdot R_{229}$, i.e by one more "step." Now, the output voltage is equal to $2I_0 \cdot R_{229} + I_0 \cdot R_{229}$, i.e. it has increased with respect to the initial voltage by three "steps."

The fourth trigger signal renders non-conducting only the third key tube 189 and hence the output voltage exceeds the initial value by $4I_0 \cdot R_{229}$, i.e. it increases by one "step" more.

The arrival of the fifth trigger signal makes the first and third key tubes 188 and 189 non-conducting, and the voltage across the output of the generator 14 increases by yet another "step".

The sixth trigger signal makes the second and third tubes non-conducting, and the voltage across the output of the generator 14 goes up by still another "step."

The seventh trigger signal renders all the three key tubes non-conducting, and the output voltage will exceed the initial value by $7I_0 \cdot R_{229}$.

The eighth trigger signal brings all the flip-flops of the generator 14 back to the initial state, and the output voltage thereof is reduced to its initial value. Thereafter, the whole cycle of stepwise growth of the voltage is repeated.

With the arrival of each new trigger signal, the output voltage of the generator 14 increases by one "step", each said trigger signal being synchronized with the beginning of sweeping of each frame. Hence, the duration of each voltage "step" corresponds to the scan period of each frame.

The initial current of each key tube is set by means of the resistor included in its cathode circuit (for the first and third tubes 188 and 189, these are the resistors 226 and 259, respectively).

The number of "steps" of the reference voltage may be reduced by disconnecting some or all the key tubes from the resistor 229 by means of the switch 262 (the switch 262 being in the position shown in the diagram, all the three key tubes are connected to said resistor). In the central position, the switch 262 connects to the resistor only the first and second key tubes, and in the upper position, only the first key tube.

The output voltage variation range, corresponding to the parameter spread being measured, is set by means of the resistor 229. The value of this range is equal to the product of the sum of the currents through the key tubes, the generator 14 being in the initial state, by the resistance value of the resistor 229. The lower limit of this range, corresponding to the level of the first region, is determined by the total current through the key tubes. The generator being in the initial state, this current reduces the output voltage with respect to the supply voltage by the value of the voltage drop across the resistor 229. The upper limit corresponds to such a state when all the key tubes are non-conducting, i.e. when the last "step" of the reference voltage appears at the output. In this case, the output voltage corresponds to the level of the last region to be found. As no current flows through the resistor 229, the output voltage becomes equal to that of the power supply.

The range of variation of the output voltage of the generator 14 is controlled by means of the voltmeter 263. Given this range and the required number of "steps", one can find the height of a "step": $U = U_o/n$, where $U_o$ is the output voltage variation range, and $n$ is the number of "steps."

To make the setting of the "step" height more convenient, it is expedient that the voltmeter 263 be graduated, in accordance with this formula, in voltage values coresponding to "step" heights.

The "step" height $U_o = I_0 \cdot R_{229}$ is set by varying the resistance of the resistor 229.

Should the need arise to increase the number of reference voltage "steps", this can be achieved by adding more flip-flop circuits each with respective key tubes. The addition of each new flip-flop circuit will double the number of "steps."

The initial level of the output voltage, corresponding to the initial state of the reference voltage generator 14, is set by varying the voltage taken from the positive voltage source, by means of the resistor 264. With the aid of the switch 262, the output voltage is applied to the control grid of the cathode follower tube 32, from the output of which this voltage is then fed to the input of the analyzer, as a reference voltage.

The initial level of the output voltage, set by means of the resistor 264, corresponds to the level of the first region of equal values of the parameter being measured. The value of the first "step" of the reference voltage corresponds to the level of the second region, the value of two said steps corresponds to the level of the third region, and so on.

Since, as noted above, the duration of each reference voltage "step" corresponds to that of the frame time-base, one region of equal values of a particular level can be found during a frame-scan period.

The variation of the anode voltage of the key tubes within 0 to 50 V achieved by varying the resistance of the resistors 264 and 229, does not affect the initial currents of the key tubes, as the latter are pentodes with a rather flat characteristic.

Since each flip-flop that follows operates later than the preceding flip-flop, the commutation of currents flowing through the resistor 229 is not simultaneous. This is why inserted between the flip-flops and key tubes are delay lines. The delay time of the delay line inserted between the second key tube and the second flip-flop is equal to the triggering time of said flip-flop, while that of the delay line 192 between the first key tube 188 and the first flip-flop 186 is equal to the double of the triggering time of the latter flip-flop. Thus, a signal arrives to the second key tube with a delay, with respect to the arrival of a signal to the input of the third flip-flop 187, equal to the triggering time of the latter. Consequently, the signal from the output of the third flip-flop 187 arrives to the input of the third key tube 189 almost simultaneously with the signal arriving to the second key tube. And the first key tube 188 receives a signal after the triggering signal is applied to the input of the flip-flop 186, the delay being equal to the double of the triggering time of the latter. This is what determines the triggering time of the first flip-flop 186.

Thus, a simultaneous commutation of the key tubes is attained with the result that additional voltage surges are precluded.

To bring the reference voltage generator 14 back to the initial state from any position, provision is made of the switch 218. As its contacts open, the resistor 219 eliminates the strong shunting action of the resistor 217 which is included in the circuit of the dividers of the grid bias voltage of the right tubes, namely the pentode 202 and the tube 239 of the flip-flops 186 and 187. The grid potential of these tubes sharply rises and the flip-flops return to their initial state, thus rendering the pentode 202 and the tube 239 conducting, and the pentode 201 and the tube 238, non-conducting.

The generator 15 of the reference voltages for the cathode-ray tube 11 serves to produce reference staircase voltages applied via the capacitor 16 to the modulator of the tube 11 to control its screen brightness.

The circuitry and operation of the reference voltage generator 15 are similar to those of the generator 14.

The return of the reference voltage generators 14 and 15 to their initial states from any position is effected by the mechanically interconnected switches 218 and 343. The switches 262 and 344 setting the required number of reference voltage "steps" are also mechanically linked.

As the commutation of reference voltage "steps" of both generators is effected in synchronism, simultaneously with a new reference voltage "step" from the generator 14, corresponding to a new region of equal values of a particular parameter, there is also applied to the modulator of the cathode-ray tube 11 a new reference voltage "step" from the output of the generator 15 to additionally illuminate the image of the region being found.

The device for measuring the non-uniformity of luminous intensity of materials with the photoelectric sensor provided with a frame time-base circuit, operates as follows.

The material being investigated is automatically swept line by line through the lens 349 (FIG. 5) by an electron beam from the transmitting tube 347, scanned by means of its frame time-base circuit 348 which operates in step with the frame time-base circuit 8 of the cathode-ray tube 11. At the output of the transmitting tube 347, namely at its signal plate, there appear signals corresponding to the luminous intensity of the material 352 being investigated at given points. These signals are obtained at the resistor 351 and applied to the input of the amplifier 7. Thereafter, the device operates in a manner similar to that of the above-described deivice for measuring the non-uniformity of luminous intensity of materials with the luminous signal source provided with a frame time-base circuit.

As a result, there appear on the screen of the visual indicator 5 images of the regions of equal values of the parameter being measured, which regions correspond to coordinates to those on the surface of the material being investigated itself. The images of the regions of equal values on the screen of the visual indicator 5 differ markedly in brightness. Said images can also be marked by any other conventional method.

To impart pulse characteristics to the signals appearing at the output of the transmitting tube 347, it should preferably fed with a pulse blanking voltage from any conventional narrow square pulse generator.

The device for measuring the non-uniformity of optical density of transparent and semitransparent materials operates as follows. The material 353 being investigated (FIG. 6) is line by line swept by a light flux from the luminous signal source 1 whose frame time-base circuit 6 operates in step with the frame time-base circuit 8 of the cathode-ray tube 11. Luminous signals passing through the material 353 being investigated, correspond by their instantaneous values to the optical density of said material at given points. The electric signals produced by the effect of these luminous signals at the output of the photoelectric multiplier, also correspond by their amplitudes to the optical density values at the same points of the material 353 being investigated.

Said electric signals are obtained at the resistor 10 and applied to the amplifier 7. Thereafter, the device operates in a manner similar to that of the above-described device for measuring the non-uniformity of luminous intensity of materials with the luminous signal source provided with a frame time-base circuit.

As a result, there appear on the screen of the cathode-ray tube 11 images of the regions of equal densities in the form of equally bright zones. The arrangement of these regions on the screen of the tube 11 correspond by coordinates to the regions of equal densities in the material 353 being investigated itself.

The images of the regions of equal densities on the screen differ sharply in brightness. They can also be marked by any other conventional method.

Should the need arise to impart pulse characteristics to the luminous signals emitted by the cathode-ray tube 9, it should preferably be fed with a pulse blanking voltage from any conventional square pulse generator.

By means of the lens 349, one can adjust the scale of the images of the equal density regions and discern the "microrelief" within a region proper.

The device for measuring the non-uniformity of photosensitivity of materials with the luminous signal source provided with a frame time-base circuit operates as follows.

The luminous scan pattern on the screen of the cathode-ray tube 9 (FIG. 7), which in this case serves as the luminous signal source 1, is projected by means of the lens 349 on the photocathode of the photoelectric multiplier being investigated. The signals produced under the effect of the light flux from the tube 9 at the output of the photoelectric multiplier and corresponding by their amplitudes to the sensitivity of the photocathode at given points, are obtained at the resistor 10 and applied to the amplifier 7. Thereafter, the device operates in a manner similar to that of the device for measuring the non-uniformity of optical density of transparent and semitransparent materials with the luminous signal source provided with a frame time-base circuit.

As a result, there appear on the screen of the cathode-ray tube 11 images of the regions of equal sensitivities in the form of equally bright zones. The arrangement of these regions on the screen corresponds by coordinates to the regions of equal sensitivites on the photocathode of the photoelectric multiplier being investigated.

By means of the lens 349, one can adjust the scale of the images of the equal sensitivity regions and discern the "microrelief" within a region proper.

The proposed device for measuring the non-uniformity of photoparametric characteristics of materials by means of luminous signals from a luminous signal source, ensures an automatic determination of the quantitative characteristic of distribution of a particular parameter over the entire surface of the material being investigated, permits of displaying this distribution on a visual indicator in the form of luminous regions of equal values of the parameter being measured, and enhances the accuracy and promptness of measurement.

What is claimed is:

1. A device for measuring the non-uniformity of a photoparametric characteristic of a material, and in particular the non-uniformity of luminous intensity of the material comprising: a luminous signal source in said material; a frame time-base circuit of said source; a photoelectric sensor disposed across the path of luminous signals from said source and transforming said luminous signals into electrical signals corresponding to the non-uniformity of luminous intensity of said source; a visual indicator connected electrically to said photoelectric sensor to display said electric signals; a decoder with input connected electrically to the output of said photoelectric sensor, the output of said decoder being connected to the input of said visual indicator; an analyzer of said decoder and connected electrically thereto, said analyzer being adapted to select, in accordance with reference electric signals generated by said decoder, signals from the plurality of signals from said photoelectric sensor which correspond to the desired level of luminous intensity of said material; a frame time-base circuit of said visual indicator synchronized with said frame time-base circuit of said luminous signal source so that when the values of the electric signals from said photoelectric sensor correspond to those of the reference signals set by said decoder, said visual indicator displays images of regions of equal values of said characteristic of said material in the form of equally bright zones whose distribution by coordinates corresponds to that of regions of equal values of the luminous intensity of said material.

2. A device as claimed in claim 1, wherein said decoder also comprises at least one generator of said reference voltages, the output of said generator being connected electrically to the input of said analyzer.

3. A device for measuring the non-uniformity of a photoparametric characteristic of a material, and in particular the non-uniformity of luminous intensity of said material comprising: the material to be measured and which is also a source of luminous signals; a photoelectric sensor disposed across the path of luminous signals from said material and transforming said luminous signals into electric signals corresponding to the non-uniformity of luminous intensity of said material; means for projecting a flux of said luminous signals from said material upon said photoelectric sensor, said means being disposed before said sensor; a visual indicator with a frame time-base circuit connected electrically to said photoelectric sensor to display said electric signals; a decoder with input connected electrically to the output of said photoelectric sensor, and with output connected to the input of said visual indicator; an analyzer of said decoder and connected electrically thereto, said analyzer being adapted to select, in accordance with reference electric signals generated by said decoder, signals from the plurality of signals from said photoelectric sensor which correspond to the desired level of luminous intensity of said material; a frame time-base circuit of said photoelectric sensor synchronized with said frame time-base circuit of said visual indicator so that when the values of the electric signals from said photoelectric sensor correspond to those of the reference electric signals set by said decoder, said visual indicator displays images of regions of equal values of said characteristic of said material in the form of equally bright zones whose distribution by coordinates corresponds to that of regions of equal values of the luminous intensity of said material.

4. A device as claimed in claim 3, wherein said decoder also comprises at least one generator of said reference voltages, the output of said generator being connected electrically to the input of said analyzer.

5. A device for measuring the non-uniformity of a photoparametric characteristic of a material, and in particular the non-uniformity of optical density of a transparent and semi-transparent material, comprising: a luminous signal source; a frame time-base circuit of said source; a photoelectric sensor disposed across the path of luminous signals passing from said source through said material placed before said photoelectric sensor, and transforming said luminous signals into electric signals corresponding to the non-uniformity of optical density of a transparent and semi-transparent material; means for projecting a flux of said luminous signals from said luminous signal source upon said photoelectric sensor disposed before said material; a visual indicator connected electrically to said photoelectric sensor to display said electric signals; a decoder with input connected electrically to the output of said photoelectric sensor, and with output connected to the input of said visual indicator; an analyzer of said decoder connected electrically thereto and adapted to select, in accordance with reference electric signals generated by said decoder, signals from the plurality of signals from said photoelectric sensor which correspond to the desired level of density of said material; a frame time-base circuit of said visual indicator synchronized with said frame time-base circuit of said luminous signal source so that when the values of the electric signals from said photoelectric sensor correspond to those of the reference electric signals set by said decoder, said visual indicator displays images of regions of equal values of the characteristic of said material in the form of equally bright zones whose distribution by coordinates corresponds to that of regions of equal values of optical density of a transparent and semi-transparent material.

6. A device as claimed in claim 5, wherein said decoder also has at least one generator of said reference voltages, the output of said generator being connected electrically to the input of said analyzer.

7. A device for measuring the non-uniformity of a photoparametric characteristic of a material, and in particular the non-uniformity of sensitivity of said material comprising: a luminous signal source; a frame time-base circuit of said source; a photoelectric sensor whose light-sensitive layer comprises the material being investigated, said sensor being disposed across the path of luminous signals from said source and transforming said luminous signals into electric signals corresponding to the non-uniformity of sensitivity of said light-sensitive layer; means for projecting a flux of said luminous signals from said luminous signal source upon said photoelectric sensor, said means being disposed before said sensor; a visual indicator connected electrically to said photoelectric sensor to display said electric signals; a decoder with input connected electrically to the output of said photoelectric sensor, and with output is connected to the input of said visual indicator; an analyzer of said decoder connected electrically thereto and adapted to select, in accordance with reference electric signals generated by said decoder, signals from the plurality of signals from said photoelectric sensor which correspond to the desired level of sensitivity of the material being investigated; a frame time-base circuit of said visual indicator synchronized with said frame time-base circuit of said luminous signal source so that when the values of the electric signals from said photoelectric sensor correspond to said reference electric signals set by said decoder, said visual indicator displays images of regions of equal values of the characteristic of said material in the form of equally bright zones whose distribution of coordinates corresponds to that of zones of equal values of sensitivity of the light-sensitive layer being investigated.

8. A device as claimed in claim 7, wherein said decoder also comprises at least one generator of said reference voltages, the output of said generator being connected electrically to the input of said analyzer.

* * * * *